(12) United States Patent
Asukabe (10) Patent No.: US 8,786,743 B2
(45) Date of Patent: Jul. 22, 2014

(54) IMAGING APPARATUS AND SHUTTER OPERATION CORRECTING METHOD

(75) Inventor: Yuki Asukabe, Saitama (JP)

(73) Assignee: Sony Corporation, Tokyo (JP)

( * ) Notice: Subject to any disclaimer, the term of this patent is extended or adjusted under 35 U.S.C. 154(b) by 96 days.

(21) Appl. No.: 13/248,545

(22) Filed: Sep. 29, 2011

(65) Prior Publication Data

US 2012/0147201 A1      Jun. 14, 2012

(30) Foreign Application Priority Data

Dec. 13, 2010  (JP) ................................. 2010-276629

(51) Int. Cl.
*H04N 5/335*   (2011.01)
*H04N 5/235*   (2006.01)

(52) U.S. Cl.
USPC ........................................ 348/296; 248/221.1

(58) Field of Classification Search
USPC ........ 348/208.99, 208.1, 208.2, 208.4, 221.1, 348/229.1, 362–368, 296, 255, 678, 625; 396/52–55; 382/270–273
See application file for complete search history.

(56) References Cited

U.S. PATENT DOCUMENTS

| 7,918,616 B2 | 4/2011 | Fukuda |
| 2007/0019937 A1* | 1/2007 | Endo ............................... 396/52 |
| 2011/0043674 A1* | 2/2011 | Takane .......................... 348/296 |
| 2011/0149130 A1* | 6/2011 | Takane .......................... 348/296 |
| 2012/0069214 A1* | 3/2012 | Shiohara .................... 348/229.1 |

FOREIGN PATENT DOCUMENTS

| JP | 2008-304565 | 12/2008 |
| JP | 2010-41510 | 2/2010 |

OTHER PUBLICATIONS

U.S. Appl. No. 13/269,695, filed Oct. 10, 2011, Asukabe.

* cited by examiner

*Primary Examiner* — Lin Ye
*Assistant Examiner* — Mekonnen Dagnew
(74) *Attorney, Agent, or Firm* — Oblon, Spivak, McClelland, Maier & Neustadt, L.L.P.

(57) ABSTRACT

An imaging apparatus includes: an imaging device that includes a plurality of pixels; a first curtain that travels to block incidence of light on the imaging device; a reset unit that sequentially reset-scans lines of the imaging device earlier than the traveling of the first curtain; and a correction controller that corrects a line reset-scanning time of the reset unit on the basis of a movement amount of the imaging device having been made to move on the basis of a camera shake detection result.

5 Claims, 10 Drawing Sheets

IMAGING APPARATUS AND SHUTTER OPERATION CORRECTING METHOD

FIELD

The present disclosure relates to an imaging apparatus and a shutter operation correcting method.

BACKGROUND

In single-lens reflex digital cameras having been spread in recent years, an electronic shutter together using a front curtain of electronic control (hereinafter, referred to as an electronic front curtain) and a rear curtain of a mechanical shutter (hereinafter, referred to as a mechanical rear curtain) has been used (see JP-A-2010-41510). In such an electronic shutter, a reset scanning operation resetting an amount of charges accumulated in pixels of an imaging device (imager) to zero is performed for each line by the use of the electronic front curtain earlier than the traveling of the mechanical rear curtain. Thereafter, by performing a scanning operation of reading a signal with an elapse of predetermined time for each line having been subjected to the reset scanning operation, an imaging operation using the electronic shutter is realized. The front curtain and the rear curtain are both controlled by a mechanical shutter in the related art, but only the operation of the front curtain is replaced with the electronic front curtain used for the line reset function of the imaging device in the electronic shutter. Accordingly, it is possible to enhance the camera performance such as shortening of a release time lag, reduction of release noise, and reduction of image fluctuation due to shutter vibration.

Most the digital cameras using the electronic shutter have a camera shake correction function. As the camera shake correction, an imager shift type camera shake correction cancelling the camera shake by shifting an imaging device body in a casing, an optical type correction driving a lens, a correction using an image process such as clipping a captured image on the imaging device, and the like are known. For example, JP-2008-304565 discloses an optical type correction correcting the camera shake on the lens side. In the interchangeable lens system disclosed in JP-A-2008-304565, it is necessary to change the traveling control of an electronic front curtain depending on an optical characteristic of a lens such as an exit pupil distance.

SUMMARY

In a mechanical shutter, since a slit width between a mechanical front curtain and a mechanical rear curtain should be controlled to be smaller as a shutter speed becomes higher, the shutter control should be performed with higher precision. For example, to realize a shutter speed of 1/4000 s or 1/8000 s, high precision in the unit of 0.1 mm should be guaranteed. When the precision is lower, there is a problem in that a target shutter speed is not achieved or the exposure on an image is not even.

In an electronic shutter, since the electronic shutter includes an electronic front curtain and a mechanical rear curtain, it is an important point to the enhancement in camera performance with what precision the electronic front curtain should be controlled with a variation in mechanical characteristic of the mechanical rear curtain. Here, examples of the variation in mechanical characteristic of the mechanical rear curtain include deterioration, a posture difference, a temperature characteristic, and an individual difference.

Specifically, in the electronic front curtain, it is necessary to accurately adjust the reset time of the electronic front curtain in a state where the positional relation between the imaging device and the mechanical rear curtain is accurately grasped. However, in the imager shift type camera shake correction, the movement amount of the imaging device body is changed depending on the amount of camera shake correction. Accordingly, after the reset time of the electronic front curtain is accurately adjusted, the positional relation between the imaging device and the mechanical rear curtain greatly varies. This means that the positional relation between the electronic front curtain and the mechanical rear curtain varies in an image capturing operation using the electronic front curtain. Therefore, when any control is not carried out, a desired shutter speed is not achieved due to the positional variation and the exposure performance is affected. Particularly, in a high-speed shutter, since it is necessary to control the slit width between the electronic front curtain and the mechanical rear curtain to be small, the control should be performed with high precision, thereby making the above-mentioned problem marked.

Therefore, it is desirable to provide new and improved imaging apparatus and shutter operation correcting method, which can control a reset scanning time of an electronic front curtain on the basis of a movement amount of an imaging device based on a detection result of camera shake.

An embodiment of the present disclosure is directed to an imaging apparatus including: an imaging device that includes a plurality of pixels; a first curtain that travels to block incidence of light on the imaging device; a reset unit that sequentially reset-scans lines of the imaging device earlier than the traveling of the first curtain; and a correction controller that corrects a line reset-scanning time of the reset unit on the basis of a movement amount of the imaging device having been made to move on the basis of a camera shake detection result.

The correction controller may correct the line reset-scanning time of the reset unit on the basis of the movement amount of the imaging device and the traveling position of the first curtain.

The correction controller may control the line reset-scanning time when an image capturing operation is performed at a shutter speed higher than a first threshold value.

The imaging apparatus may further include an image processing unit that corrects an image captured by an electronic shutter operation performed by the first curtain and the reset unit using a correction gain based on the movement amount of the imaging device and a slit width.

The imaging apparatus may further include an image storage unit that stores a plurality of correction tables each having a correction gain used to correct an image, and the image processing unit may select one correction table corresponding to the movement amount of the imaging device and the slit width from the plurality of correction tables and may correct the captured image using the correction gain of the selected correction table.

The imaging apparatus may further include an image storage unit that stores the captured image, and the image processing unit may calculate a correction gain from a difference between an image captured at a shutter speed higher than a second threshold value and an image captured at a shutter speed lower than the higher shutter speed out of the images stored in the image storage unit and may correct the image captured at the higher shutter speed using the calculated correction gain.

The imaging apparatus may further include a second curtain that permits the incidence of light on the imaging device earlier than the traveling of the first curtain, and the image processing unit may calculate a correction gain from a difference between an image captured by a mechanical shutter operation performed by the traveling of the first curtain and the second curtain and an image captured by the electronic shutter operation and may correct the image captured by the electronic shutter operation using the calculated correction gain.

Another embodiment of the present disclosure is directed to a shutter operation correcting method including: causing a correction controller to correct a line reset-scanning time on the basis of the movement amount of an imaging device having been made to move on the basis of a camera shake detection result; and causing a reset unit to sequentially reset-scan lines of the imaging device at the corrected time earlier than the traveling of a first curtain for blocking incidence of light on the imaging device.

According to the above-mentioned embodiments of the present disclosure, it is possible to control the reset-scanning time of the electronic front curtain on the basis of the movement amount of the imaging device based on the camera shake detection result.

DETAILED DESCRIPTION

Hereinafter, preferred embodiments of the present disclosure will be described in detail with reference to the accompanying drawings. In this specification and the accompanying drawings, constituent elements having substantially the same functional configuration will be referenced by the same reference numerals and signs and description thereof will not be repeated.

Figure 1:
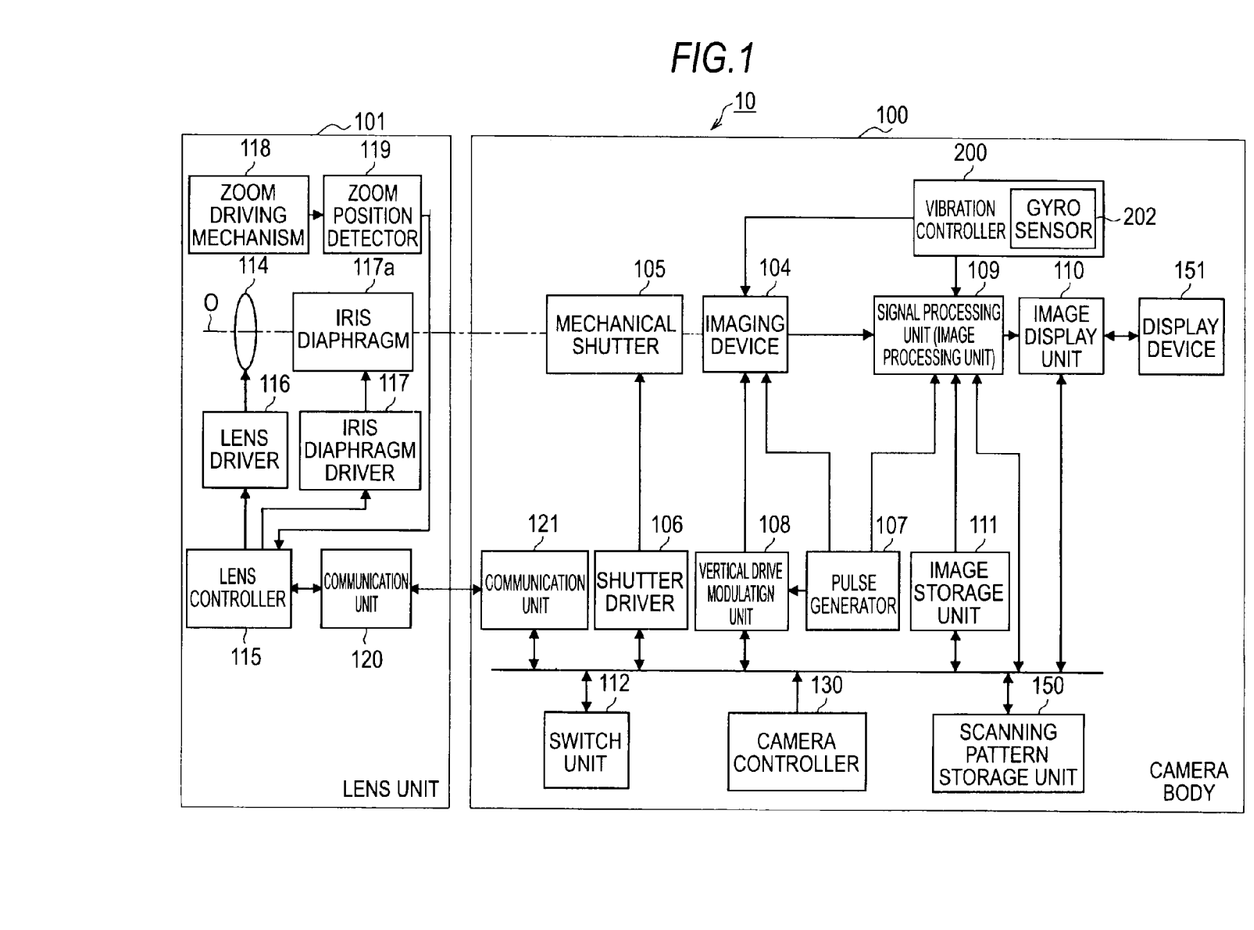
FIG. 1 is a diagram illustrating the basic configuration of an imaging apparatus according to embodiments of the present disclosure.

The description is made in the following order.
1. Basic Configuration of Imaging Apparatus of Embodiment
2. First Embodiment
(2-1) Functional Features of Imaging Apparatus
(2-2) Operation of Imaging Apparatus
3. Second Embodiment
4. Third Embodiment
5. Conclusion 1. Basic Configuration of Imaging Apparatus of Embodiment The basic configuration common to the preferred embodiments will be first described with reference to FIG. 1. FIG. 1 is a diagram illustrating the basic configuration of an imaging apparatus 10 according to the preferred embodiments of the present disclosure. As shown in FIG. 1, the imaging apparatus 10 according to the embodiments includes a camera body 100 and an interchangeable lens unit 101 as an image-capturing optical system attached to the camera body 100.

First, the internal configuration of the lens unit 101 will be described. The lens unit 101 includes an imaging lens 114, a lens controller 115, a lens driver 116, an iris diaphragm driver 117, an iris diaphragm 117a, a zoom driving mechanism 118, a zoom position detector 119, and a communication unit 120.

The imaging lens 114 can move in an optical axis direction. Although it is shown in FIG. 1 that the imaging lens 114 includes a single lens, the imaging lens actually includes plural lenses such as a focus lens and a zoom lens. The lens controller 115 controls the lens driver 116 to drive the imaging lens 114, controls the iris diaphragm driver 117 to drive the iris diaphragm 117a, and controls the iris diaphragm to correspond to subject brightness when performing an image capturing operation. By operating (manually operating in the embodiments) the zoom driving mechanism 118, the position of the zoom lens can be shifted. The position (focal distance) of the operated zoom lens is detected by the zoom position detector 119 and is sent to the lens controller 115. The lens controller 115 can communicate with a camera controller 130 in the camera body 100 to be described later via the communication unit 120 of the lens unit 101 and a communication unit 121 of the camera body 100. The lens controller 115 sends lens information such as the type of the lens unit 101, the focal distance, the exit pupil distance, and the focal position (focus position) to the camera controller 130 via the communication units 120 and 121.

The configuration of the camera body 100 will be described below. The camera body 100 includes an imaging device 104, a mechanical shutter 105, a shutter driver 106, a pulse generator 107, a vertical drive modulating unit 108, a signal processing unit 109, an image display unit 110, an image storage unit 111, a switch unit 112, a communication unit 121, a camera controller 130, a scanning pattern storage unit 150, a display device 151, and a camera shake controller 200. The camera shake controller 200 includes a gyro sensor 202.

When the imaging apparatus 10 is in a non-image-capturing state, a subject light beam passing through the imaging lens 114 and the iris diaphragm 117a of the lens unit 101 travels to the imaging device 104 constructed by a CMOS (Complementary Metal Oxide Semiconductor) sensor, a CCD (Charge Coupled Device), or the like. The pixels of the imaging device 104 photoelectrically convert a subject optical image formed by the lens unit 101 during the exposure depending on the light intensity and accumulate the acquired charges. The accumulated charges are sent to the signal processing unit 109 and image data generated in real time by the signal processing unit 109 are output to the display device 151 via the image display unit 110 and are displayed as a real-time image. Accordingly, a camera operator can observe the subject image on the display device 151.

When a release button not shown and described later is pushed and the non-image-capturing state is changed to an image-capturing state, the imaging device 104 is supplied with a scanning clock (a horizontal driving pulse) or a predetermined control pulse from the pulse generator 107. A vertical scanning clock out of scanning clocks generated by the pulse generator 107 is modulated into a predetermined clock frequency by the vertical drive modulating unit 108 and is input to the imaging device 104. A scanning pattern of a reset scanning performed on lines of the imaging device 104 including plural pixels is determined by the vertical drive modulating unit 108. The function of an electronic front curtain is implemented by the reset scanning on the lines of the imaging device 104. The pulse generator 107 outputs a clock signal to the signal processing unit 109 to be described later.

A focal plane shutter (hereinafter, referred to as a "mechanical shutter") 105 which is a mechanical shutter is disposed closer to a subject (the lens) than the imaging device 104. The mechanical shutter 105 may includes only a rear curtain (hereinafter, referred to as a "mechanical rear curtain") including plural light-shielding blades or may include a mechanical rear curtain and a front curtain (hereinafter, referred to as a "mechanical front curtain") including plural light-shielding blades and traveling earlier than the traveling of the mechanical rear curtain. In this embodiment, when the mechanical rear curtain is provided, the mechanical front rear curtain does not have to be provided. However, in the second embodiment, the mechanical front curtain along with the electronic front curtain and the mechanical rear curtain is a necessary constituent element of the imaging apparatus 10.

Here, the imaging apparatus 10 according to the embodiments includes an electronic shutter mechanism performing an image capturing operation using a reset scanning operation of the electronic front curtain performed in the imaging device 104 and the mechanical rear curtain of the mechanical shutter 105. In the electronic shutter mechanism, the electronic front curtain is constructed by the line reset-scanning operation performed in the imaging apparatus 104 and the mechanical rear curtain is constructed by the mechanical shutter 105. In such an electronic shutter mechanism, a reset-scanning operation of resetting the amount of charges accumulated in the pixels to zero is performed on lines of plural pixels of the imaging device 104. Thereafter, after a predetermined time passes, by sequentially shielding the imaging device from light by the use of the mechanical rear curtain and then performing a reading scanning operation of sequentially reading the charges accumulated in the pixels, the image-capturing operation (the electronic shutter operation) of the electronic shutter is implemented.

When the mechanical front curtain is provided, the mechanical shutter mechanism permits the incidence of light on the imaging device 104 by causing the mechanical front curtain covering the imaging device 104 to travel, and blocks the incidence of light on the imaging device 104 by then causing the mechanical rear curtain to travel. Accordingly, the image-capturing operation (the mechanical shutter operation) of the mechanical shutter is implemented.

The mechanical rear curtain blocking the incidence of light on the imaging device 104 corresponds to the "first curtain" described in the appended claims and the mechanical front curtain traveling earlier than the traveling of the mechanical rear curtain corresponds to the "second curtain" described in the appended claims.

The other configuration of the camera body 100 will be described below. The shutter driver 106 controls the traveling of the mechanical front curtain and the mechanical rear curtain of the mechanical shutter 105. The shutter driver 106 adjusts the slit width by adjusting the time to start the traveling of the mechanical rear curtain and controls the exposure time (shutter speed).

The signal processing unit 109 generates image data by performing a correlation double sampling (CDS) process, a gain (AG) process, and predetermined processes (such as a coloring process and a gamma correction process) on the signal read from the imaging device 104. The generated image data is output to the display device 151 via the image display unit 110 and is displayed as a captured image, or is stored in the image storage unit 111. The signal processing unit 109 also has the function of an image processing unit, which will be described later.

The switch unit 112 includes a switch controlling ON/OFF of a main power source, a switch operated to set image-capturing conditions and the like, and a switch (a release button) operated to start a preliminary image-capturing operation and an image-capturing operation. The preliminary image-capturing operation (such as a photometric operation or a focus adjusting operation) is started by a half pressing operation on the release button. The image-capturing operation (the exposure of the imaging device 104 and the reading of charge signals and the recording of image data obtained by processing the charge signals in a recording medium) is started by a full pressing operation.

The camera controller 130 is a CPU (Central Processing Unit) serving as an operation processing unit or a control unit and controls the overall operations of the imaging apparatus on the basis of various programs. The camera controller 130 operates to correspond to the operation on the switch unit 112.

The scanning pattern storage unit 150 stores plural types of scanning patterns of the electronic front curtain as described later. The scanning pattern is a pattern of the reset-scanning time performed on the lines of the imaging device 104 as the electronic front curtain.

The camera shake controller 200 detects the shake of the camera body 100 using a sensor such as a gyro sensor 202 or the like. The gyro sensor 202 includes, for example, includes a yaw angular velocity sensor detecting an angular velocity based on the camera shake in the yaw direction and a pitch angular velocity sensor detecting an angular velocity based on the camera shake in the pitch direction. The gyro sensor 202 is an example of a sensor detecting the shake of the camera body 100 and the camera shake may be detected using an acceleration sensor as another type of sensor. When the acceleration sensor is used, the output of the acceleration sensor can be integrated to calculate a velocity and the velocity can be integrated to calculate a moving distance. Accordingly, it is possible to determine the magnitude of the camera shake on the basis of the output of the acceleration sensor.

The camera shake controller 200 calculates the magnitude of the camera shake on the basis of the detection signal output from the gyro sensor 202 and calculates the movement amount by which the body of the imaging device 104 should be made to move to cancel the camera shake on the basis of the calculated magnitude of the camera shake. The camera shake controller 200 makes the body of the imaging device 104 move by the calculated movement amount. The camera shake controller 200 sends the movement amount of the imaging device 104 to the camera controller 130 via the signal processing unit 109.

Figure 2:
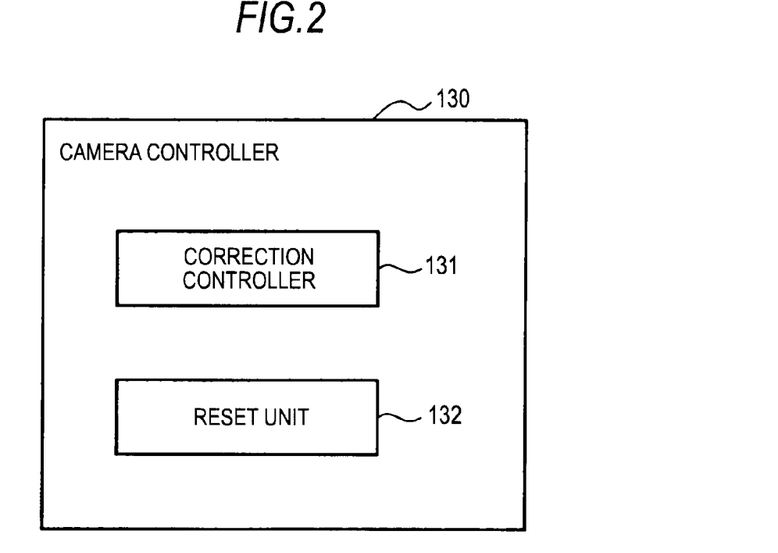
FIG. 2 is a functional block diagram illustrating the configuration of a camera controller according to the embodiments of the present disclosure.

The camera controller 130 will be described below with reference to FIG. 2. As shown in FIG. 2, the camera controller 130 includes a correction controller 131 and a reset unit 132.

The correction controller 131 receives the movement amount of the imaging device 104 from the signal processing unit 109 and corrects the line reset-scanning time of the reset unit 132 on the basis of the received movement amount.

The reset unit 132 implements the function of the electronic front curtain by sequentially reset-scanning the lines of pixels of the imaging device 104 at a predetermined time. Specifically, the reset unit 132 controls the vertical drive modulating unit 108 to input a reset-scanning clock to the imaging device 104 from the vertical drive modulating unit 108. When the imaging device 104 moves by a predetermined distance due to the camera shake, the reset unit 132 sequentially reset-scans the lines of pixels of the imaging device 104 at a corrected time.

The processes of the units of the camera controller 130 are implemented by hardware (not shown) such as the CPU, a ROM (Read Only Memory), and a RAM (Random Access Memory) incorporated into the imaging apparatus 10. Here, the ROM stores programs or computation parameters used by the CPU. The RAM temporarily stores programs used by the CPU or parameters appropriately changed at the time of executing the programs. These units are connected to each other via a host bus constructed by a CPU bus or the like.

The basic configuration of the imaging apparatus 10 according to the embodiments of the present disclosure has been described hitherto. The image-capturing operation using the shutter mechanisms will be described in detail below with reference to the accompanying drawings.

(Image-Capturing Operation Using Mechanical Shutter Mechanism)

Figure 3:
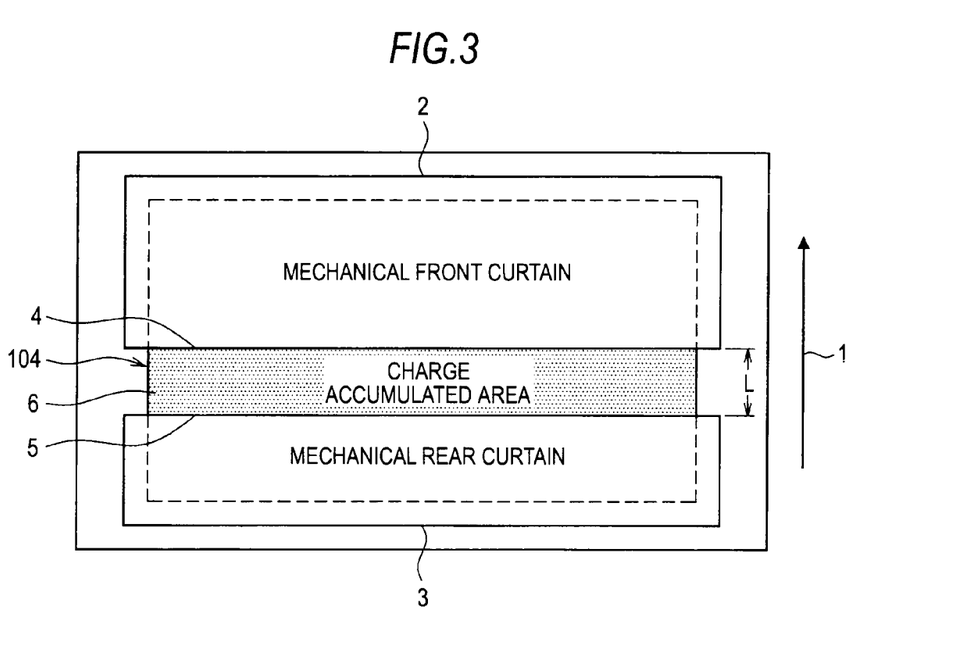
FIG. 3 is a front view illustrating an imaging device, a mechanical front curtain, and a mechanical rear curtain in a mechanical shutter mechanism according to the embodiments of the present disclosure as viewed along an optical axis direction from a lens side.

The image-capturing operation using the mechanical shutter mechanism which can be implemented when the mechanical front curtain is mounted will be first described with reference to FIG. 3. FIG. 3 is a front view illustrating the imaging device 104, a mechanical front curtain 2, and a mechanical rear curtain 3 as viewed along the optical axis direction from the lens side and shows a state where the mechanical front curtain is traveling and the mechanical rear curtain is traveling after the image-capturing operation is started by pressing the release button. The arrow 1 indicates the traveling direction of the mechanism front curtain 2 and the mechanical rear curtain 3.

FIG. 3 shows a state where the mechanical front curtain 2 and the mechanical rear curtain 3 of the mechanical shutter 105 shield the upper part and the lower part of the imaging device 104.

A slit area 6 between an end 4 of the mechanical front curtain 2 and an end 5 of the mechanical rear curtain 3 is an area (charge accumulated area) which is not shielded by the mechanical front curtain 2 and the mechanical rear curtain 3 and in which charges are accumulated in the imaging device 104 due to the exposure. The charge accumulated area 6 moves in the direction of the arrow 1 with the traveling of the mechanical front curtain 2 and the mechanical rear curtain 3. The time until the imaging device 104 is shielded by the mechanical rear curtain 3 after the end 4 of the mechanical front curtain 2 passes, that is, after the incidence of light on the imaging device 104 is permitted, is a charge accumulating time due to the exposure of the pixels. Accordingly, by adjusting a slit width L, the charge accumulated area 6 can be changed to adjust the exposure time.

In this way, since the end 4 of the mechanical front curtain 2 travels in the direction of the arrow 1 to start the accumulation of charges in the lines, the charge accumulation start time varies among the lines of the imaging device 104. In the example shown in FIG. 3, the charge accumulating operation is performed at the earliest time in the line located at the lowermost position of the imaging device 104 and the charge accumulating operation is performed at the latest time in the line located at the uppermost position.

The traveling of the mechanical front curtain 2 and the mechanical rear curtain 3 from the lower part to the upper part of the imaging device 104 is controlled by the shutter driver 106. The shutter driver 106 adjusts the slit width L to control the exposure time (the shutter speed) by adjusting the time to start the traveling of the mechanical rear curtain 3.

(Image-Capturing Operation Using Electronic Shutter Mechanism)

Figure 4:
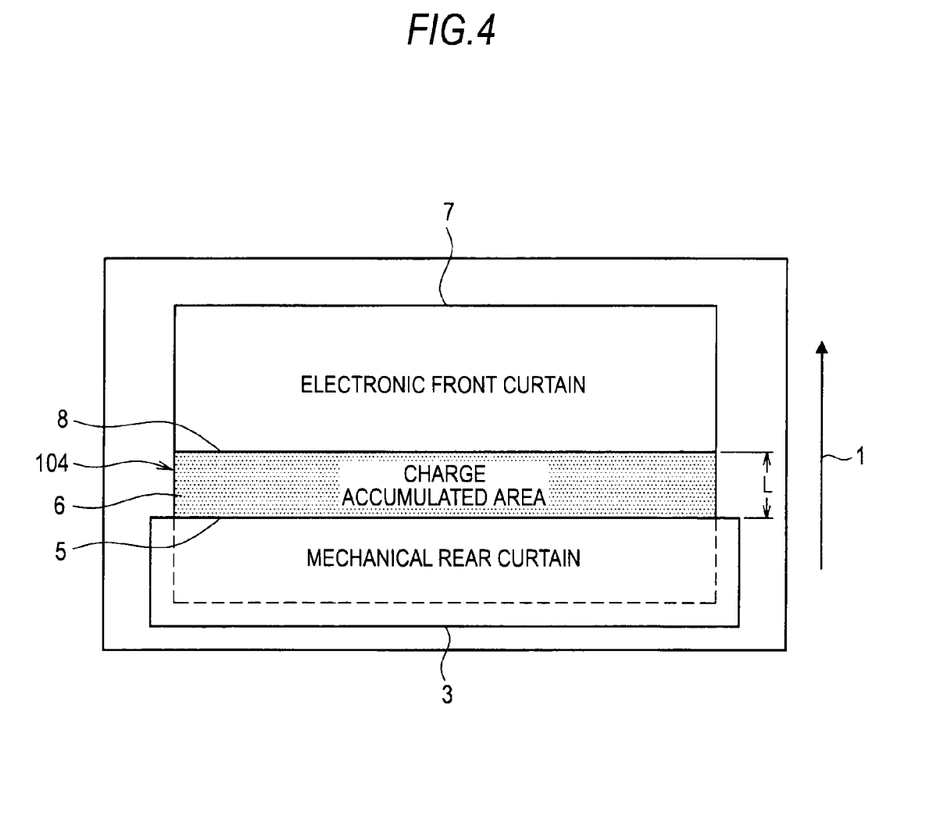
FIG. 4 is a front view illustrating an imaging device, an electronic front curtain, and a mechanical rear curtain in an electronic shutter mechanism according to the embodiments of the present disclosure as viewed along the optical axis direction from the lens side.

The image-capturing operation using the electronic shutter mechanism will be first described with reference to FIG. 4. FIG. 4 is a front view illustrating the imaging device 104 and the mechanical rear curtain 3 as viewed along the optical axis direction from the lens side and shows a state where the reset scanning is being performed in the imaging device 104 and the mechanical rear curtain 3 is traveling after the image-capturing operation is started by pressing the release button. The arrow 1 indicates the traveling direction (the traveling direction of an electronic front curtain 7) of the reset scanning and the traveling direction of the mechanical rear curtain 3.

FIG. 4 shows a state where the mechanical rear curtain 3 of the mechanical shutter 105 shields a partial area of the imaging device 104. A line (reset line) 8 of the reset scanning performed in the imaging device 104 is shown in FIG. 4. The reset line 8 is a line in which the amount of charges accumulated in the pixels is zero and corresponds to the end of the electronic front curtain 7.

The area 6 formed by the slit between the reset line 8 and the end 5 of the mechanical rear curtain 3 is an area (charge accumulated area) in which the charges are accumulated due to the exposure in the imaging device 104. The charge accumulated area 6 moves in the direction of the arrow 1 with the traveling of the electronic front curtain 7 and the mechanical rear curtain 3. The time until the imaging device 104 is shielded by the mechanical rear curtain 3 after the reset line 8 passes, that is, after the lines of pixels are sequentially reset in the direction of the arrow 1, is a charge accumulating time due to the exposure of the pixels. In this way, since the reset line 8 travels in the direction of the arrow 1 to start the accumulation of charges in the lines, the charge accumulation start time varies among the lines of the imaging device 104. In the example shown in FIG. 4, the charge accumulating operation is performed at the earliest time in the line located at the lowermost position of the imaging device 104 and the charge accumulating operation is performed at the latest time in the line located at the uppermost position.

The movement (the reset scanning) of the reset line 8 from the lower part to the upper part of the imaging device 104 is controlled by the vertical drive modulating unit 108. The movement pattern of the reset line 8 is referred to as a "scanning pattern". The scanning pattern indicates the time to perform the reset scanning on the lines of the imaging device 104, as described above. The scanning pattern storage unit 150 stores plural scanning patterns different, for example, in the focal distance, the exit pupil distance, and the like. The camera controller 130 selects one scanning pattern depending on the focal distance, the exit pupil distance, or the like of the mounted lens and controls the vertical drive modulating unit 108 to cause the reset line 8 to move along the selected scanning pattern.

(How to Reach Embodiments)

Problems in the imager shift type camera shake correction and the necessity for the timing correction of the electronic front curtain will be described with reference to FIG. 5. In the imager shift type camera shake correction, an operation of cancelling the camera shake is started on the basis of the output of the camera shake detection signal just after the image-capturing sequence is started. When the dynamic characteristic of an imager shift type camera shake correction mechanism is stabilized, the exposure (the image-capturing) sequence is started to start the exposure of the imaging device 104 and the electronic front curtain and the mechanical rear curtain travel at a predetermined shutter speed to end the exposure (the image-capturing) sequence.

As described above, since the electronic shutter includes the electronic front curtain and the mechanical rear curtain, with what precision the electronic front curtain can be controlled with respect to the variation in mechanical characteristic of the mechanical rear curtain is an important point to improve the camera performance.

Specifically, regarding the electronic front curtain, it is necessary to accurately adjust the reset time of the electronic front curtain in the state where the positional relation between the imaging device 104 and the mechanical rear curtain is accurately grasped. In the left side of FIG. 5, the line reset-scanning time of the imaging device 104 is adjusted so that the exposure time is constant wherever the shutter curtain including the electronic front curtain and the mechanical rear curtain is located as the position before correcting the shake of the imaging device 104. With an adjusted value, the electronic front curtain and the mechanical rear curtain are controlled to cause the correct exposure result in the state where the imaging device 104 is located at the center position of the shutter curtain. In this case, the electronic front curtain and the mechanical rear curtain are adjusted to cause the correct exposure result, even when the target of the exposure time is ¼000 s or ⅛000 s.

Figure 5:
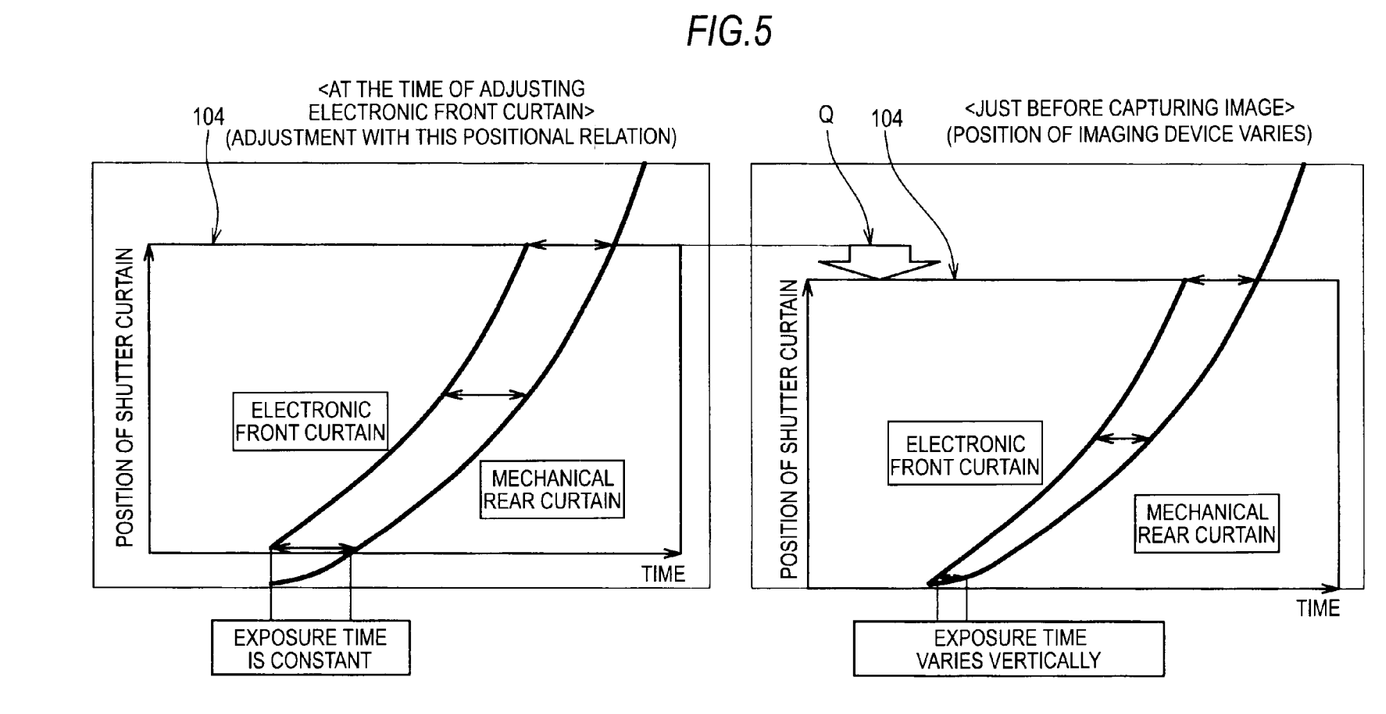
FIG. 5 is a diagram illustrating the relationship between a movement amount of the imaging device based on camera shake correction and a temporal variation of an electronic shutter operation.

Here, two solid curves of FIG. 5 indicate the operating positions of the electronic front curtain and the mechanical rear curtain. Since the mechanical rear curtain travels after the line reset-scanning of the imaging device 104, the curve of the operating position (the reset scanning time) of the electronic front curtain is shown earlier than the curve indicating the operating position of the mechanical rear curtain. The horizontal width between two curves represents the exposure time and the vertical width therebetween represents the slit width. In the left side of FIG. 5, the horizontal width between two curves is constant and thus the exposure time is controlled to be constant.

However, in the imager shift type camera shake correction, the body of the imaging device 104 is made to move. At this time, the movement amount of the body of the imaging device 104 is changed depending on the magnitude of the camera shake. In the right side of FIG. 5, the body of the imaging device 104 is shifted down by the movement amount Q depending on the magnitude of the camera shake. As a result, the positional relation between the imaging device 104 and the mechanical rear curtain greatly varies and the horizontal width between two curves is not constant, whereby the exposure time varies vertically depending on the position of the shutter curtain.

In this way, in the imager shift type camera shake correction, since the operating time is taken until the dynamic characteristic of the mechanical shutter is stabilized just after the release sequence is started, it is necessary to perform the operation of causing the imaging device 104 to move for a predetermined time regardless of the shutter speed at the time of the image capturing operation. Accordingly, at the time of starting the exposure of the imaging device 104, the position of the electronic front curtain relative to the position of the mechanical rear curtain is not constant.

Figure 6:
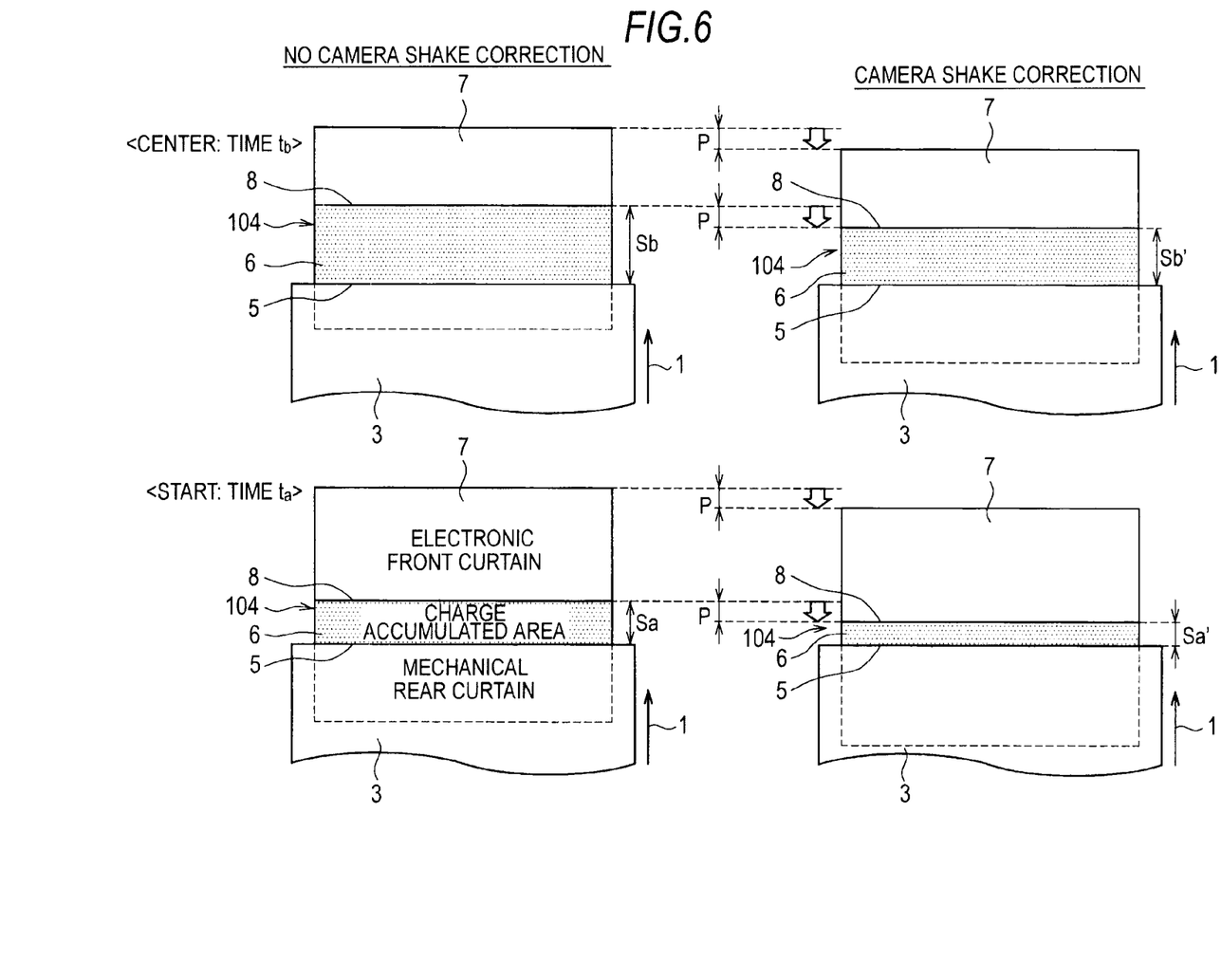
FIG. 6 is a diagram illustrating the relationship between the movement amount of the imaging device based on the camera shake correction and a variation in slit width.

In the case where the imager shift type camera shake correction is not performed, for example, as shown in the left side of FIG. 6, the slit width is adjusted to Sa as shown in the lower-left side of FIG. 6 when the shutter curtain is located at the start position (time $t_a$) and the slit width is adjusted to Sb as shown in the upper-left side of FIG. 6 when the shutter curtain is located at the center position (time $t_b$). Since the mechanical rear curtain 3 of the mechanical shutter 105 is slowly accelerated from the start of the traveling, the slit width is slowly increased from the start of the traveling to adjust the exposure time for each line of pixels of the imaging device 104. Therefore, the slit width is the smallest at the time of the start of the traveling. In this way, by adjusting the slit width to an appropriate value to correspond to the traveling speed of the mechanical rear curtain, the exposure time is controlled to be constant.

On the other hand, in the case where the imager shift type camera shake correction is performed as shown in the right side of FIG. 6, the slit width is adjusted to Sa' as shown in the lower-right side of FIG. 6 at the start position (time $t_a$) and the slit width is adjusted to Sb' as shown in the upper-right side of FIG. 6 at the center position (time $t_b$). In this way, when the position of the imaging device 104 is shifted due to the camera shake correction, the slit width departs from the appropriate value and thus the exposure time is not controlled to be constant. Accordingly, without any control, the desired shutter speed is not achieved due to the positional difference of the imaging device 104, thereby affecting the exposure performance.

2. First Embodiment (2-1) Functional Feature of Imaging Apparatus

In the imaging apparatus 10 according to a first embodiment of the present disclosure, the line reset-scanning time of the reset unit 132 is corrected on the basis of the movement amount of the imaging device 104 by the correction controller 131 of the camera controller 130 shown in FIG. 2. Specifically, the correction controller 131 corrects the line reset-scanning time of the reset unit 132 on the basis of the movement amount of the imaging device 104 and the traveling position of the mechanical rear curtain so that the exposure time is constant.

Figure 7:
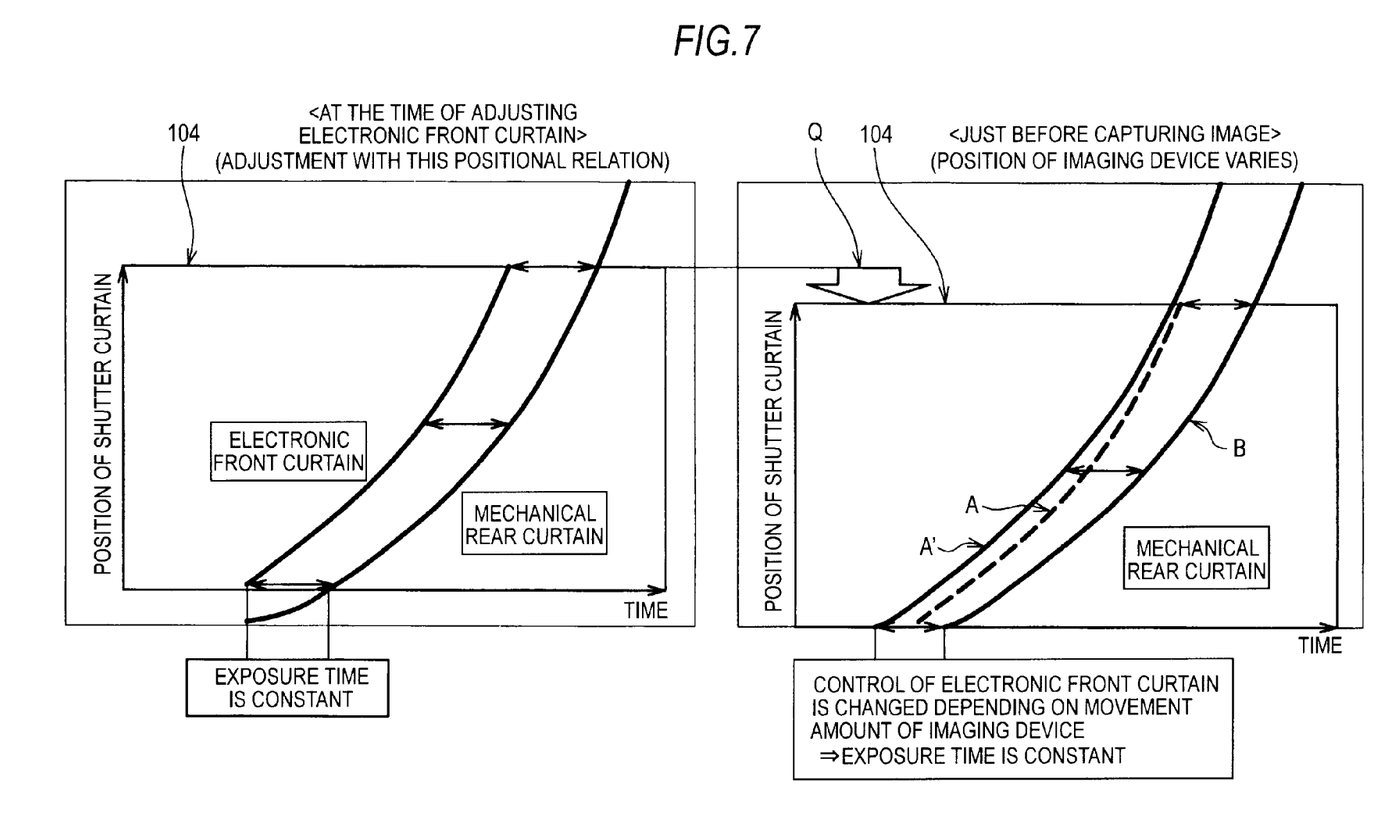
FIG. 7 is a diagram illustrating correction of a reset scanning time of an electronic front curtain according to a first embodiment of the present disclosure.

For example, in the right side of FIG. 7, the curve indicating the operating position of the electronic front curtain is corrected from curve A to curve A' by controlling the line reset-scanning time of the reset unit 132. Accordingly, the horizontal width between the electronic front curtain and the mechanical rear curtain after the correction is constant, thereby controlling the exposure time to be constant.

(2-2) Operation of Imaging Apparatus

Figure 8:
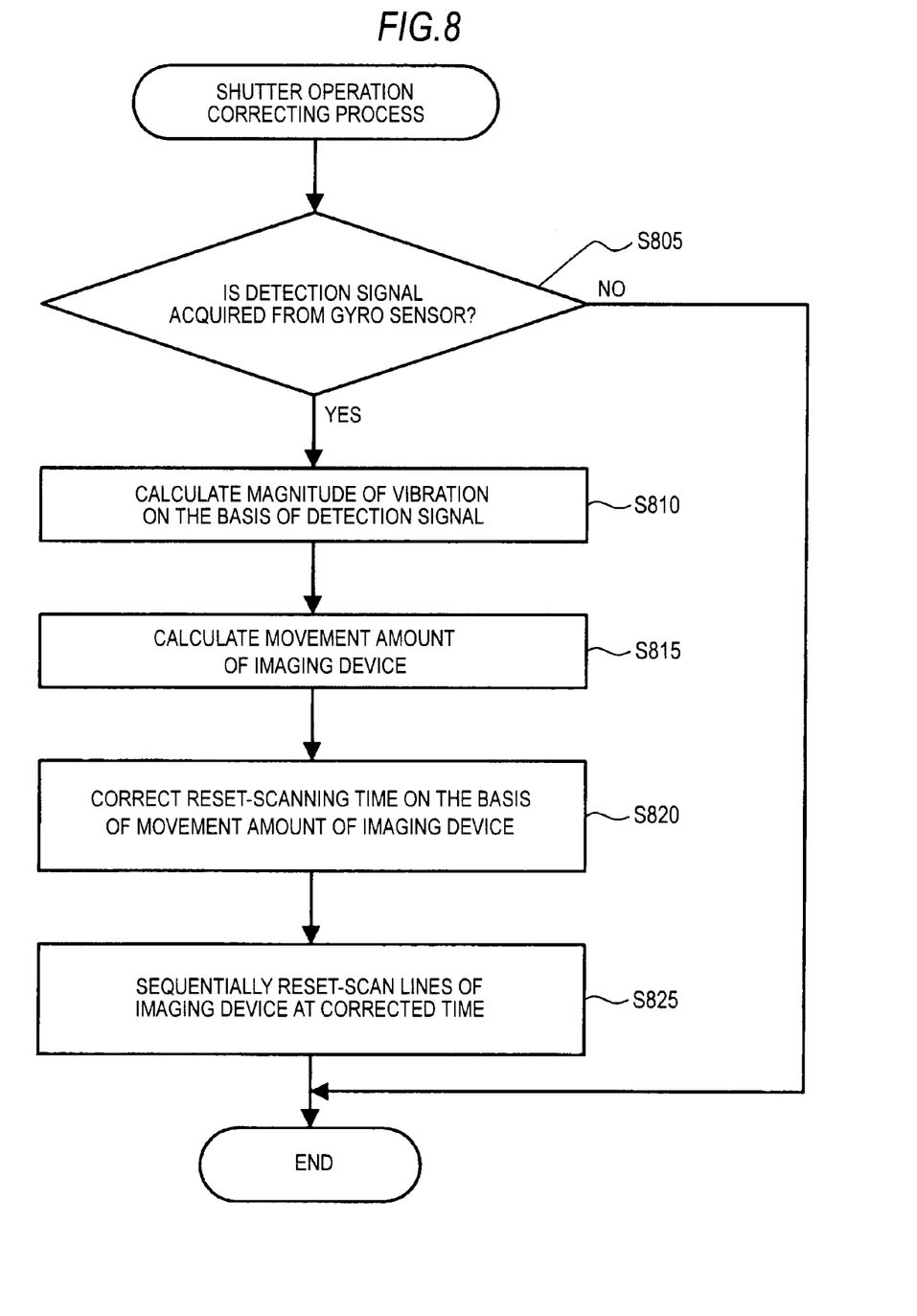
FIG. 8 is a flowchart illustrating a shutter operation correcting process according to the first embodiment.

The operation of the imaging apparatus 10 according to the first embodiment will be described below with reference to the flowchart of the shutter operation correcting process shown in FIG. 8. First, in step S805, the camera shake controller 200 determines whether a detection signal obtained by detecting the camera shake of the camera body 100 by the use of the gyro sensor 202 is acquired.

When it is determined that the detection signal is not acquired, this process is ended at once. On the other hand, when it is determined the detection signal is acquired, the camera shake controller 200 calculates the magnitude of the camera shake on the basis of the detection signal from the gyro sensor 202 in step S810. Then, in step S815, the camera shake controller 200 calculates the movement amount by which the body of the imaging device 104 should move to cancel the camera shake on the basis of the calculated magnitude of the camera shake.

In step S820, the correction controller 131 corrects the line reset-scanning time of the reset unit 132 on the basis of the calculated movement amount of the imaging device and the traveling position of the mechanical rear curtain. In step S825, the reset unit 132 sequentially reset-scans the lines of pixels of the imaging device 104 at the corrected time.

Accordingly, as described above, the curve indicating the operating position (the reset-scanning time) of the electronic front curtain in FIG. 7 is corrected from curve A to curve A' and the horizontal width from curve B indicating the operating position of the mechanical rear curtain becomes constant. Accordingly, the exposure time is controlled to be constant.

Figure 10:
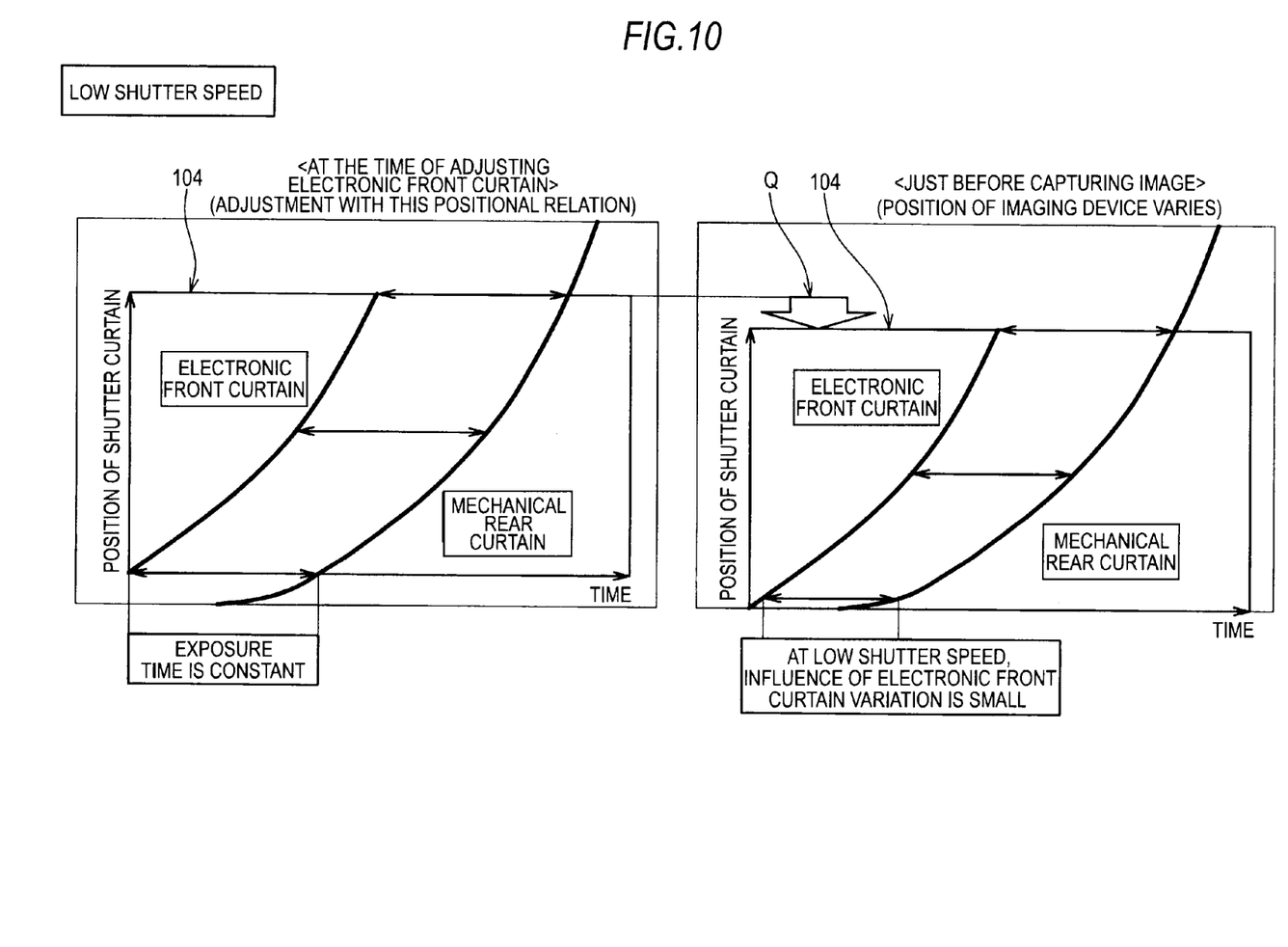
FIG. 10 is a diagram illustrating a temporal variation of an electronic shutter operation of a low-speed shutter according to a third embodiment of the present disclosure.
Figure 11:
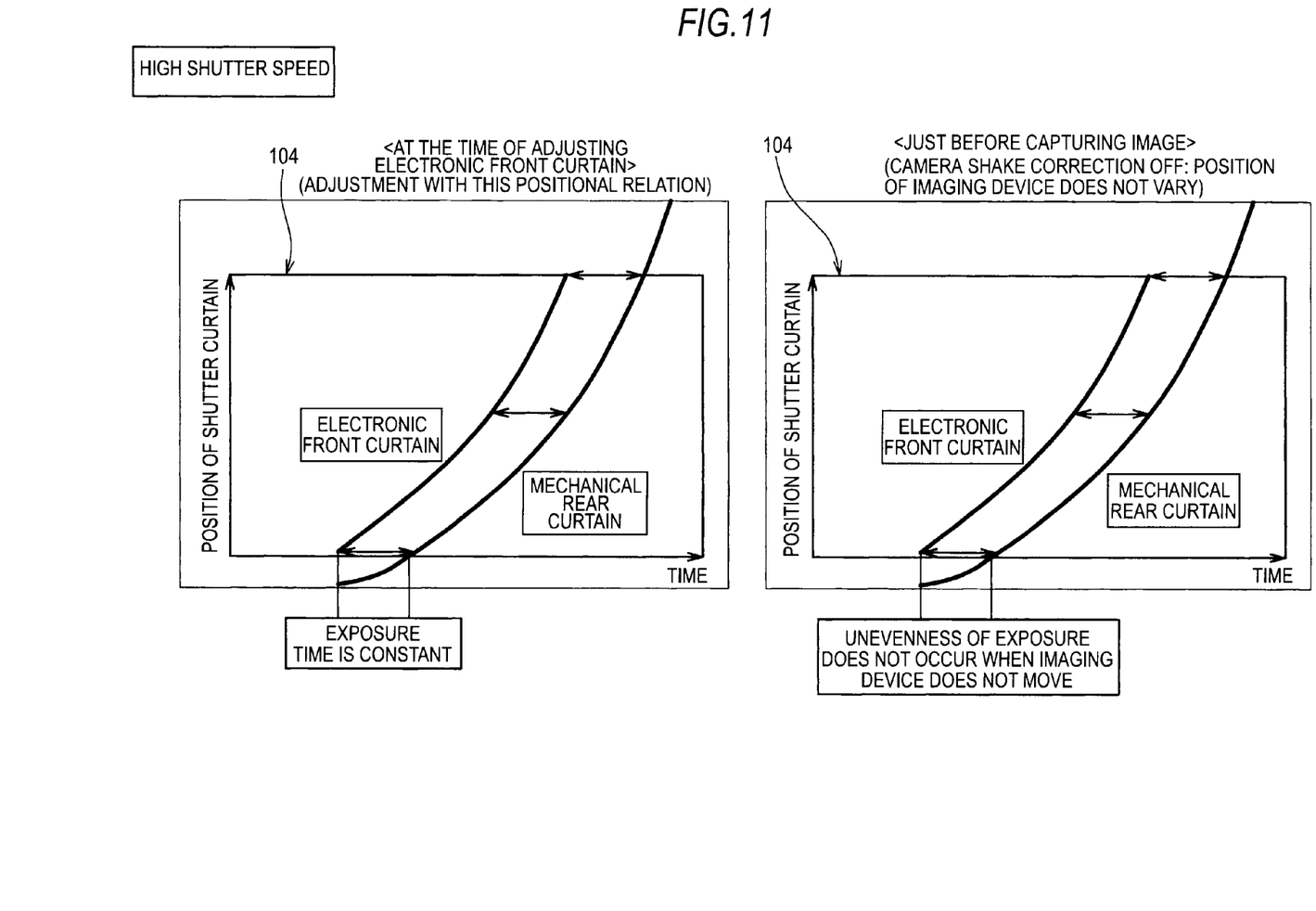
FIG. 11 is a diagram illustrating a temporal variation of an electronic shutter operation of a high-speed shutter according to the third embodiment of the present disclosure.

Particularly, as shown in FIG. 10, in case of a low shutter speed, the horizontal width between the curves indicating the operating positions of the electronic front curtain and the mechanical rear curtain is great and the exposure time is long. On the other hand, as shown in FIG. 11, in case of a high shutter speed, the horizontal width between the curves indicating the operating positions of the electronic front curtain and the mechanical rear curtain is small and the exposure time is short. Accordingly, as the shutter speed becomes higher, it is necessary to control the slit width between the electronic front curtain and the mechanical rear curtain to be smaller. Therefore, in case of a high shutter speed, it is necessary to perform the control with higher precision, compared with the case of a low shutter speed. Accordingly, in case of a low shutter speed, the influence of the camera shake correction on the shift of the curve indicating the operating position of the electronic front curtain is small. However, in case of a high shutter speed, the dynamic characteristic stabilization waiting time and the movement amount of the imaging device 104 are sufficient to lower the exposure precision, except a static case where the camera is fixed on a tripod or the like.

Therefore, the correction controller 131 may correct the line reset-scanning time when an image is captured at a shutter speed higher than a predetermined first threshold value, and may consider that the influence on the exposure precision is small to skip the process of correcting the line reset-scanning time without considering the movement amount of the imaging device 104 when an image is captured at a shutter speed lower than the first threshold value. Even when an image is captured at a shutter speed lower than the first threshold value, the process of correcting the line reset-scanning time may be performed. It is preferable that the first threshold value is $1/500$ s.

As described above, in the imaging apparatus 10 according to this embodiment, the reset-scanning time of the electronic front curtain can be controlled to control the exposure time to be constant on the basis of the movement amount of the imaging device 104 based on the detection result of the camera shake of the casing. The imaging apparatus 10 according to this embodiment does not have to include the mechanical front curtain of the mechanical shutter mechanism when it includes the electronic shutter mechanism (the electronic front curtain and the mechanical rear curtain).

3. Second Embodiment

An imaging apparatus 10 according to a second embodiment of the present disclosure will be described below. In the first embodiment, the imager shift type camera shake correction is used for the shake of the casing to make the imaging device 104 itself move. At this time, how the casing departs is detected by the use of the gyro sensor 202, the state where the casing moves is measured on the basis of the detection signal, and the imaging device 104 is made to move so as to cancel the shake of the imaging device 104. The traveling time of the electronic front curtain is corrected on the basis of the movement amount of the imaging device 104.

However, in the feedback control in which the reset-scanning time of the electronic front curtain is corrected on the basis of the detection signal from the gyro sensor 202, an image with the unevenness of exposure may be captured due to the influence of a time lag until the reset-scanning time is corrected after the shake of the casing is detected.

Therefore, the second embodiment of the present disclosure is provided with the function of an image processing unit that corrects the captured image on the basis of the movement amount of the imaging device 104 and the slit width between the electronic front curtain and the mechanical rear curtain. The function of the image processing unit is implemented by the gain process of the signal processing unit 109.

Figure 9:
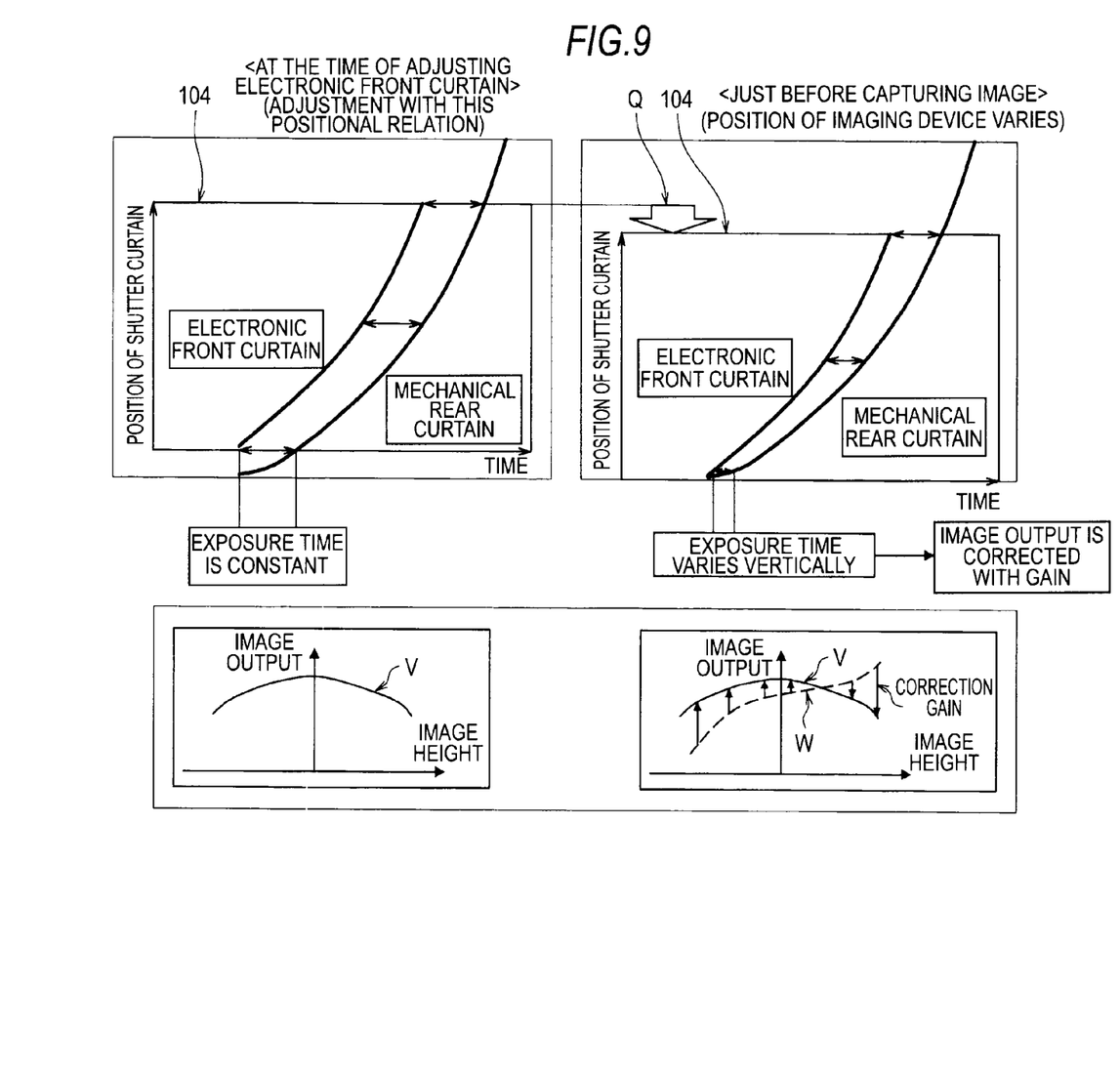
FIG. 9 is a diagram illustrating an image process according to a second embodiment of the present disclosure.

Several methods can be considered as an image processing method. First, a first image processing method will be described with reference to FIG. 9. The lower-left side of FIG. 9 shows an example of a correction table stored in the image storage unit 111. In the correction table, the horizontal axis represents an image height (ideal) and the vertical axis represents the image output (gain). The correction table includes previously-measured exposure errors caused in the relationship between the shutter speed (slit width) and the movement amount of the imaging device 104. Plural correction tables are stored in advance in the image storage unit 111.

The image processing unit (the signal processing unit 109) selects a correction table corresponding to the movement amount of the imaging device 104 and the necessary slit width from the plural correction tables stored in the image storage unit 111. The image processing unit calculates the difference between a gain V of the ideal image height of the selected correction table and a gain W of the actual image height of the captured image as a correction gain and performs an image process of cancelling the unevenness of exposure of the captured image using the correction gain.

In this case, even when an image with the unevenness of exposure is captured by the influence of a time lag from the acquisition of the detection signal from the gyro sensor 202 to the reset-scanning time, the unevenness of exposure of the image can be cancelled by the image process using the correction gain.

As shown in the right side of FIG. 7, the curve indicating the operating position of the electronic front curtain is corrected to curve A' through the use of the correction method according to the first embodiment, the electronic shutter operation is performed, and then the image process according to this embodiment is performed on the captured image. However, as shown in the right side of FIG. 9, the image process according to this embodiment may be performed on the image captured by performing the electronic shutter operation with curve A without correcting the curve indicating the operating position of the electronic front curtain.

In a second image processing method of the image process according to this embodiment, for example, the captured image is stored in the image storage unit 111. The image processing unit calculates a correction gain from the difference between an image captured at a shutter speed higher than a second threshold value and an image captured at a shutter speed lower than the higher shutter speed out of the images stored in the image storage unit 111. The image processing unit corrects the image captured at the higher shutter speed using the calculated correction gain. In this case, it is not necessary to register the correction table in advance. In the first and second image processing methods, the mechanical front curtain is not necessarily used. It is preferable that the second threshold value is $\frac{1}{500}$ s.

On the other hand, in case of a camera including the mechanical front curtain and capable of performing both the mechanical shutter operation and the electronic shutter operation, the following image processing method can be performed. The image processing unit calculates the correction gain from the difference between an image captured through the use of the mechanical shutter operation performed by the traveling of the mechanical front curtain and the mechanical rear curtain and an image captured through the use of the electronic shutter operation performed by the resetting of the electronic front curtain and the traveling of the mechanical rear curtain. The image processing unit corrects the image captured through the use of the electronic shutter operation using the calculated correction gain. In this case, in the image capturing through the use of the mechanical shutter operation, the movement amount of the imaging device 104 does not influence the exposure precision. Accordingly, by processing the image captured through the electronic shutter operation using the difference from the image captured through the use of the mechanical shutter operation as the correction gain, it is possible to cancel the unevenness of exposure of the image.

4. Third Embodiment

An imaging apparatus 10 according to a third embodiment will be described below. As described above, in the imager shift type camera shake correction, the horizontal width between the curves indicating the operating positions of the electronic front curtain and the mechanical rear curtain is great and the exposure time is long in case of the low shutter speed shown in FIG. 10. On the other hand, in case of the high shutter speed shown in FIG. 11, the horizontal width between the curves indicating the operating positions of the electronic front curtain and the mechanical rear curtain is small and the exposure time is short. Accordingly, it is necessary to control the slit width between the electronic front curtain and the mechanical rear curtain to be smaller, as the shutter speed becomes higher. Accordingly, in case of the high shutter speed, it is necessary to perform the control with higher precision, compared with the case of the low shutter speed. Therefore, in case of the low shutter speed, even when the curve indicating the operating position of the electronic front curtain due to the camera shake correction is shifted (positional error), it hardly influence the exposure precision.

On the other hand, from the viewpoint of the camera shake correction, the camera shake correction may be more easily caused as the shutter speed becomes lower and the camera shake correction is hardly caused in case of the high shutter speed.

Therefore, in the imaging apparatus 10 according to the third embodiment, a lower shutter speed threshold value (third threshold value) at which the imaging device 104 does not influence the exposure precision is determined in advance, the imager shift type camera shake correction is performed when the shutter speed is lower than the third threshold value, and the imager shift type camera shake correction is not performed when the shutter speed is higher than the third threshold value. Accordingly, it is possible to implement the optimal image capturing operation with the electronic front curtain. It is preferable that the third threshold value is $\frac{1}{500}$ s.

In this embodiment, in case of a high shutter speed, at least one of the lens optical type camera shake correction or the electronic camera shake correction may be used instead of the imager shift type camera shake correction.

The third threshold value may be dynamically changed depending on the movement amount of the imaging device 104 at the time of capturing an image.

5. Conclusion

As described above, in the imaging apparatuses 10 according to the embodiments of the present disclosure, it is possible to control the reset-scanning time of the electronic front curtain on the basis of the movement amount of the imaging device based on the camera shake detection result. Accordingly, in the imaging apparatus 10 mounted with the imager shift type camera shake correction mechanism, it is possible to optimally capture an image through the electronic front curtain.

While the preferred embodiments of the present disclosure are described above with reference to the accompanying drawings, the present disclosure is not limited to the embodiments. The present disclosure can be clearly modified in various forms by those skilled in the art without departing from the technical concept described in the appended claims and the modifications should be understood to belong to the technical scope of the present disclosure.

For example, a computer program causing the hardware incorporated into the imaging apparatus 10 to perform the same functions as the elements of the imaging apparatus 10 may be implemented. A recording medium having the computer program recorded thereon may be also provided.

The present disclosure contains subject matter related to that disclosed in Japanese Priority Patent Application JP 2010-276629 filed in the Japan Patent Office on Dec. 13, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging device that includes a plurality of pixels;
    a first curtain configured to travel to block incidence of light on the imaging device;
    a second curtain configured to permit the incidence of light on the imaging device earlier than traveling of the first curtain;
    and
    circuitry configured to:
        sequentially resetting reset-scan lines of the imaging device earlier than the traveling of the first curtain;
        correct a line reset-scanning time associated with the sequentially resetting on the basis of a movement amount of the imaging device having been made to move on the basis of a camera shake detection result;
        correct an image captured by an electronic shutter operation performed by the first curtain and the sequentially resetting using a correction gain based on the movement amount of the imaging device and a slit width; and calculate the correction gain from a difference between an image captured by a mechanical shutter operation performed by the traveling of the first curtain and the second curtain and an image captured by the electronic shutter operation and corrects the image captured by the electronic shutter operation using the calculated correction gain.

2. The imaging apparatus according to claim 1, wherein the circuitry is further configured to correct the line reset-scanning time associated with the sequentially resetting on the basis of the movement amount of the imaging device and a traveling position of the first curtain.

3. The imaging apparatus according to claim 1, wherein the circuitry is further configured to control the line reset-scanning time when an image capturing operation is performed at a shutter speed higher than a first threshold value.

4. The imaging apparatus according to claim 1, wherein the circuitry is further configured to store a plurality of correction tables each specifying a correction gain and select one of the plurality of correction tables which corresponds to the movement amount of the imaging device and the slit width and correct the image captured by the electronic shutter operation using a correction gain associated with the selected correction table.

5. A shutter operation correcting method comprising:

correcting, by processing circuitry, a line reset-scanning time on the basis of a movement amount of an imaging device having been made to move on the basis of a camera shake detection result;

sequentially resetting, by the processing circuitry, reset-scan lines of the imaging device at the corrected line reset-scanning time, which is earlier than the traveling of a first curtain that blocks incident light on the imaging device;

correcting an image captured by an electronic shutter operation performed by the first curtain and the sequentially resetting using a correction gain based on the movement amount of the imaging device and a slit width;

storing the captured image;

calculating the correction gain from a difference between an image captured at a shutter speed higher than a first threshold value and an image captured at a shutter speed lower than the higher shutter speed out of stored images; and correcting the captured image at the higher shutter speed using the calculated correction gain.

* * * * *